United States Patent
Kurokawa (10) Patent No.: US 8,384,970 B2
(45) Date of Patent: Feb. 26, 2013

(54) IMAGE READING APPARATUS AND IMAGE FORMING APPARATUS HAVING THE SAME

(75) Inventor: Takashi Kurokawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 357 days.

(21) Appl. No.: 12/910,100

(22) Filed: Oct. 22, 2010

(65) Prior Publication Data

US 2011/0096379 A1  Apr. 28, 2011

(30) Foreign Application Priority Data

Oct. 27, 2009  (JP) .................. 2009-246895

(51) Int. Cl.
*H04N 1/04* (2006.01)

(52) U.S. Cl. ........ 358/498; 358/488; 358/496; 358/449; 271/3.5; 271/3.01; 399/367; 399/82

(58) Field of Classification Search .................. 358/498, 358/488, 497, 496, 451, 528, 449; 271/3.05, 271/162, 264, 3.01, 3.13; 399/367, 82, 85, 399/370

See application file for complete search history.

(56) References Cited

U.S. PATENT DOCUMENTS

| | | | | |
|---|---|---|---|---|
| 4,791,451 A | * | 12/1988 | Hirose et al. .............. | 399/370 |
| 5,201,505 A | | 4/1993 | Shah | |
| 5,946,527 A | * | 8/1999 | Salgado et al. ................. | 399/82 |
| 7,793,933 B2 | * | 9/2010 | Morimoto et al. ............ | 271/264 |
| 8,208,171 B2 | * | 6/2012 | Kubo et al. .................... | 358/1.9 |
| 8,274,711 B2 | * | 9/2012 | Hiro .............................. | 358/474 |
| 8,310,744 B2 | * | 11/2012 | Morimoto ..................... | 358/527 |

FOREIGN PATENT DOCUMENTS

| | | |
|---|---|---|
| JP | 06-85998 A | 3/1994 |
| JP | 2002-274659 A | 9/2002 |
| JP | 2003-201046 A | 7/2003 |
| JP | 2006-027804 A | 2/2006 |
| JP | 2008-129095 A | 6/2008 |

* cited by examiner

*Primary Examiner* — Negussie Worku (74) *Attorney, Agent, or Firm* — Renner, Otto, Boisselle & Sklar, LLP (57) ABSTRACT

A document setting position on a document set tray 101 where a small-sized document is set is determined by positionally matching a near-side reference position (a position of or set in the vicinity of a user-side end of a document placement surface of the document set tray 101) and a user-side edge of the document. An output tray 114 has a window 115 made from a transparent material so as to allow a user to see a document setting position on the document set tray 101 where the user sets a small-sized document. This makes it possible to adjust a position on the document set tray 101 where a document is placed, in use of an image reading apparatus 100 in which the document set tray 101 for placing thereon a document to be read is provided below the output tray 114 for placing a read document thereon.

8 Claims, 9 Drawing Sheets

FIG. 1 (a)
NORMAL-SIZED DOCUMENT

FIG. 1 (b)
SMALL-SIZED DOCUMENT

FIG. 6 (b)
A-A CROSS SECTION

IMAGE READING APPARATUS AND IMAGE FORMING APPARATUS HAVING THE SAME

This Nonprovisional application claims priority under 35 U.S.C. §119(a) on Patent Application No. 2009-246895 filed in Japan on Oct. 27, 2009, the entire contents of which are hereby incorporated by reference.

TECHNICAL FIELD

The present invention relates to an image reading apparatus arranged to: pick up a document placed on a document tray; carry the document to a reading section; read an image on the document by the reading section; and output the document into an paper output tray provided above the document tray.

BACKGROUND ART

Image reading apparatuses have been widely used heretofore in each of which a document set tray in which a document to be read is placed and an output tray in which a read document is outputted are vertically disposed. Such image reading apparatuses are advantageous in that this disposition realizes small sizes. On the other hand, a user has a difficulty in visually recognizing a document placed on the lower tray.

As a solution to this, for example, Patent Literature 1 discloses a technique for allowing a user to visually recognize a document on the output tray from above the document set tray, in order to prevent a user from leaving a document outputted into the output tray. According the technique, in an image reading apparatus in which the output tray is disposed below the document set tray, a part of the document set tray is made from a transparent material so that a document on the output tray may be visually recognized from above the document set tray.

In use of an image reading apparatus which carries documents of various types which are different in size so as to carry out an image reading process of the documents, a user usually matches a position on the document set tray where a document is placed with a predetermined position corresponding to a size of a document.

For example, Patent Literature 2 discloses the following arrangement. Guide members slidable along a width direction of a document are provided to both ends adjacent in the width direction. The guide members are coupled to each other via a pinion. One guide member moves along the width direction, and accordingly, the other guide member axisymmetrically moves around a center line, along the width direction, of a document set tray.

CITATION LIST

Patent Literature 1
Japanese Patent Application Publication, Tokukai, No. 2003-201046 A (Publication Date: Jul. 15, 2003)
Patent Literature 2
Japanese Patent Application Publication, Tokukai, No. 2006-27804 A (Publication Date: Feb. 2, 2006)

SUMMARY OF INVENTION

The technique of Patent Literature 1 is about an image reading apparatus in which the output tray is provided below the document set tray. In contrast, image reading apparatuses are recently used in each of which a document set tray is provided below an output tray. Particularly, an image reading apparatus which carries and reads small-sized documents such as business cards and various cards is likely to have a difficulty in inflecting the small-sized documents while carrying along a carrying path curved like "U." For this reason, such image reading apparatus has the document set tray below the output tray in many cases so that the document carrying path may be straight from the document set tray to the reading section.

However, in the case of such an image reading apparatus, the document set tray is covered by the output tray as viewed from above. Therefore, it is difficult to visually check a document and the document set tray while placing the document thereon. This leads to a difficulty in properly adjusting a position on the document set tray where the document is placed.

As for a small-sized document, the output tray provided above the document set tray becomes an obstacle for a user in an arrangement in which the position is adjusted with reference to a center of a document along its width direction. This makes more difficult to visually check the position. Further, this requires a user to deeply put his hand in between the document set tray and the output tray so as to adjust the position. This also leads to a problem in that it is particularly difficult to properly adjust the position.

The present invention was made in view of the problems. An object of the present invention is to realize easy adjustment of a position on a document set tray where a document is placed, in an image reading apparatus in which the document set tray for placing thereon a document to be read is provided below an output tray to which a document is outputted after being read.

In order to attain the object, an image reading apparatus of the present invention includes: a document set tray for placing a document thereon; carrying means for carrying the document placed on the document set tray; a reading section for reading an image on the document carried by the carrying means; and an output tray to which the document after the reading of the image on the document by the reading section is outputted, the output tray being provided so as to overlap, above the document set tray, the document set tray as vertically viewed from above, the image reading apparatus having (i) a small-size mode in which a small-sized document is carried so as to be read and (ii) a normal-size mode in which a normal-sized document is carried so as to be read, the small-sized document having, along a document width direction, a size not greater than a predetermined size, the document width direction being that direction of a width of a document which is perpendicular to a direction in which the document is carried by the carrying means, the normal-sized document having, along the document width direction, a size greater than the predetermined size, the document set tray being arranged such that at least in a case where a small-sized document is placed on the document set tray, positioning of the document to a document setting position on the document set tray is carried out by positionally matching a first edge of the document with a near-side reference position, the near-side reference position set to a position of or set in the vicinity of a first end of a document placement surface of the document set tray, wherein the first edge of the document is that one of two edges of the small-sized document which is closer, than the other one of the two edges, to a user-operating side of the image reading apparatus, and the first end of the document placement surface is one of those two ends of the document placement surface which are located along the document width direction, the one being closer to the user-operating side of the image reading apparatus than the other one of the two ends, and the output tray having a window made from a transparent material, the window allowing a user to see the document setting position in a case where the document placed on the document set tray is a small-sized document.

According to the arrangement, the document set tray is arranged such that at least in a case where a small-sized document is placed on the document set tray, positioning of the document to the document setting position on the document set tray is carried out by positionally matching the first edge of the document with the near-side reference position. Further, the output tray has a window made from a transparent material which window allows a user to see the document setting position in a case where the document placed on the document set tray is a small-sized document. This allows a user to place a small-sized document on the document set tray at a position closer to the user. Furthermore, this allows the user to visually check, via the window, the small-sized document and the position on the document set tray where the small-sized document is placed, while placing the small-sized document thereon. Therefore, the user can see the document while adjusting the position even though the output tray is provided above the document set tray. This makes it possible to adjust the position easily and properly. Therefore, the user can see the document while adjusting the position even though the output tray is provided above the document set tray. This makes it possible to adjust the position easily and properly.

Advantageous Effects of Invention

As described above, the image reading apparatus of the present invention has (i) the small-size mode and (ii) the normal-size mode. The document set tray is arranged such that at least in a case where a small-sized document is placed on the document set tray, positioning of the document to a document setting position on the document set tray is carried out by positionally matching the first edge of the document with the near-side reference position. The output tray has a window made from a transparent material which window allows a user to see the document setting position in a case where the document placed on the document set tray is a small-sized document.

Therefore, a user can adjust easily and properly a position on the document set tray where a small-sized document is placed even though the output tray is provided above the document set tray.

BRIEF DESCRIPTION OF DRAWINGS

FIG. 1(a) is a plan view illustrating, from above, an image reading apparatus of one embodiment of the present invention. FIG. 1(a) illustrates placement of a normal-sized document.

FIG. 1(b) is a plan view illustrating, from above, the image reading apparatus of the one embodiment of the present invention. FIG. 1(b) illustrates placement of a small-sized document.

FIG. 4(a) is a cross-sectional view illustrating the image reading apparatus of FIG. 1. FIG. 4(a) shows a carrying path for the normal-sized document.

FIG. 4(b) is a cross-sectional view illustrating the image reading apparatus of FIG. 1. FIG. 4(b) shows a carrying path for the small-sized document.

DESCRIPTION OF EMBODIMENTS

The following describes one embodiment of the present invention.

Figure 2:
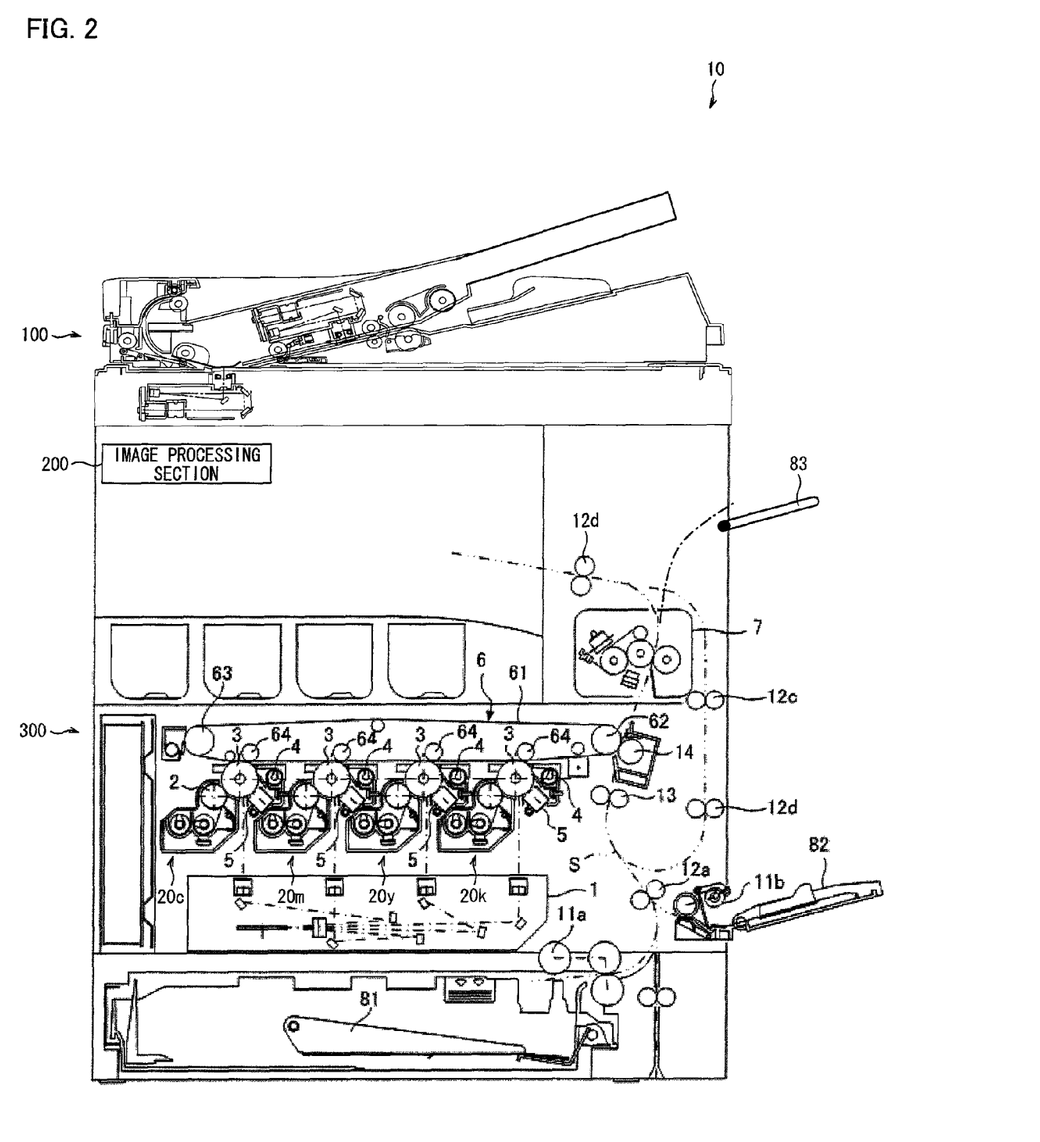
FIG. 2 is a cross-sectional view illustrating an image forming apparatus of the one embodiment of the present invention.

FIG. 2 is a cross-sectional view of a copying machine 10 of the present embodiment. As illustrated in FIG. 2, the copying machine 10 includes an image reading apparatus 100, an image processing section 200, and an image forming section (printing section) 300.

Although the present embodiment mainly deals with application of the present invention to a copying machine, the present invention is not limitedly applied to this. For example, the present invention can be applied to a multi function printer having functions such as (i) image transmission functions (facsimile function and scan-to-email function) of transmitting, to another device via a network, image data read by the image reading apparatus 100, and (ii) a printer function of printing an image in accordance with image data received via a network or image data read out from various storage media.

The image reading apparatus 100 is provided on a top surface of a housing in which the image forming section 300 and the image processing section 200 are housed. The image reading apparatus 100 obtains image data of a document by reading an image on the document. The image reading apparatus 100 has (i) a non-carrying mode in which a document placed on a scanner platen is read, (ii) a small-size mode (small-sized document carrying and reading mode) in which a small-sized document is carried and read which is a document having, along a main scanning direction (document width direction), a size not greater than a predetermined size, and (iii) a normal-size mode (normal-sized document carrying and reading mode) in which a normal-sized document is carried and read which is a document having, along the main scanning direction, a size greater than the predetermined size. Details of the image reading apparatus 100 are described later.

The image processing section 200 carries out an image process of converting, into image data suitable for a printing process to be carried out by the image forming section 300, image data read from a document by the image forming apparatus 100.

The image forming section 300 forms (prints) an image on a recording material in accordance with image data supplied from the image processing section 200.

An arrangement of the image forming section 300 is not particularly limited. The present embodiment adopts an electrophotographic one. Specifically, the image forming section 300 includes: a paper feeding tray 81; a manual paper feeding tray 82; pickup rollers 11a and 11b; carrying rollers 12a, 12b, 12c, and 12d; image forming units 20c, 20m, 20y, and 20k; a intermediate transfer device 6; a second transfer roller 14, and a fixing device 7.

In accordance with image data, the image forming units 20c, 20m, 20y, and 20k form a cyan toner image, a magenta toner image, a yellow toner image, and a black toner image, respectively. The image forming units have substantially the same arrangement, except that the image forming units use toner of respective different colors. Specifically, each of the image forming units includes: a photoreceptor drum 3; a charger 5 for uniformly charging a surface of the photoreceptor drum 3; an optical scanning unit 1 which forms an electrostatic latent image on a charged surface of the photoreceptor drum 3 by irradiating, with light generated in accordance with image data of a color corresponding to the image forming unit, the charged surface; a developing device 2 which develops, with toner of the color, the electrostatic latent image; and a cleaning device for removing toner which is not transferred from the photoreceptor drum 3 onto an intermediate transfer belt 61 (to be described later) but remains on the surface of the photoreceptor drum 3.

The intermediate transfer device 6 includes supporting rollers 62 and 63, an intermediate transfer belt 61 which is suspended by the supporting rollers 62 and 63 so as to be driven to rotate; and transfer rollers 64 provided so as to face respective photoreceptor drums 3 via the intermediate transfer belt 61. A voltage to be applied to each of the transfer rollers 64 is a voltage having a polarity opposite to a polarity of a toner image formed on a corresponding photoreceptor drum 3. Accordingly, color toner images formed on the photoreceptor drums 3 are transferred onto the intermediate transfer belt 61 so as to superimposed each other thereon. The toner image transferred onto the intermediate transfer belt 61 is carried by the rotation of the intermediate transfer belt 61 to a position where the intermediate transfer belt 61 faces the second transfer roller 14.

In sync with this, a recording material onto which the toner image is transferred is carried to between the second transfer roller 14 and the intermediate transfer belt 61. That is, carried to between the second transfer roller 14 and the intermediate transfer belt 61 are (1) a recording material which is extracted from the paper feeding tray 81 by the pickup roller 11a and then carried via the carrying roller 12a, a registration roller 13, etc., (2) a recording material which is extracted from the manual paper feeding tray 82 by the pickup roller 11b and then carried via the carrying roller 12a, the registration roller 13, etc., or (3) a recording material which is subjected to a fixing process carried out by the fixing device 7, then reversed due to a switch back by the carrying roller 12d, and secondly carried via the carrying rollers 12c and 12d, the registration roller 13, etc. A voltage to be applied to the second transfer roller 14 is a high voltage having a polarity opposite to that of the toner. Accordingly, the toner image on the intermediate transfer belt 16 is secondly transferred onto the recording material.

Then, the recording material is carried to the fixing device 7 so that the fixing device 7 may carry out a process of fixing the toner image onto the recording material. After the process is carried out, the recording material is outputted into a paper output tray 83. In the case of double-side printing, a recording material whose one side has been subjected to a fixing process is carried to the carrying roller 12d so as to change its direction, in a switchback manner, to the position where the second transfer roller 14 and the intermediate transfer belt 61 face each other, via the carrying rollers 12c and 12d, the registration roller 13, etc.

Provided, on a near side in FIG. 2, onto an end of on the upper surface of the housing in which the image processing section 200 and the image forming section 300 are housed are (i) an operation input section for receiving a user's instruction input and (ii) a control panel (not illustrated) having a display section for displaying various types of information to a user. As a result, a user standing on the near side in FIG. 2 with respect to the copying machine 10 can: place, on the image reading apparatus 100, a document to be read by the image reading apparatus 100; retrieve the document after its image is read; and input an instruction via the control panel.

Respective operations of sections of the copying machine 10 are controlled by a control section (not illustrated).

The following describes details of the image reading apparatus 100.

Figure 3:
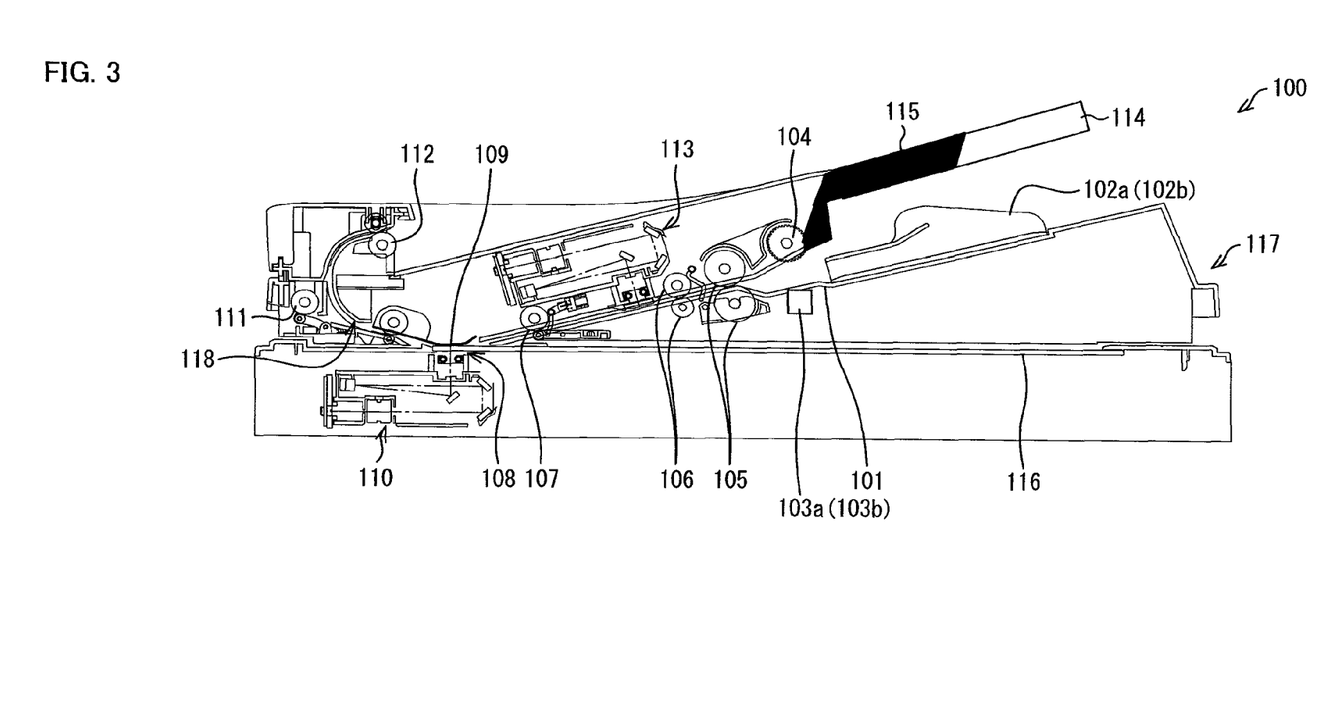
FIG. 3 is a cross-sectional view illustrating the image reading apparatus of FIG. 1.

FIG. 3 is a cross-sectional view of the image reading apparatus 100. As illustrated in FIG. 3, the image reading apparatus 100 includes a document placement glass 116 and an automatic carrying unit 117. An end of the automatic carrying unit 117 is rotatably supported on a far side in FIG. 3. The automatic carrying unit 117 can be moved from a position where the automatic carrying unit 117 covers the surface of the document placement glass (scanner platen) 116 as illustrated in FIG. 3 to a position where the surface is exposed upward.

A first reading section (reading section) 110 is provided below the document placement glass 116. The first reading section 110 reads a document placed on the document placement glass 116 while moving a horizontal direction in FIG. 3, thereby obtaining image data of the document. Specifically, the first reading section 110 includes: a light source for emitting, onto a document, light for reading the document; and an image pickup device, such as a CCD (Charge Coupled Device), for converting optical information into an electric signal. While moving with respect to a document, the first reading section 110 irradiates a document with light from the light source so as to receive, by the image pickup device, light reflected on the document. The light thus received is converted into an electric signal. Thus, the first reading section 110 obtains image data of the document.

The automatic carrying unit 117 includes: a document set tray 101; document alignment guides (guide members; size detection measures) 102a and 102b; document detector sensors (reference detection measures) 103a and 103b; a pickup roller (carrying measure) 104; paper feeding rollers (carrying measures) 105; carrying rollers (carrying measures) 106 and 107; a reading glass 108; a reading guide 109; output rollers (carrying measures) 111 and 112; a second reading section 113; an output tray 114; and a carrying direction switching section 118. The output tray 114 has a window 115 made from a transparent material.

The document set tray 101 is a tray for placing thereon a document to be read.

The document alignment guides 102a and 102b are guide members for positioning, along a direction perpendicular to a carrying direction of a document placed on the document set tray 101 (along the main scanning direction; a document width direction). Each of the document alignment guides 102a and 102b has a guide position sensor (not illustrated) for detecting its position, along the main scanning direction, with respect to the document set tray 101. Detection results of positions of the document alignment guides 102a and 102b in setting a document are supplied to a reading control section (control section) 130 to be described later.

The document detector sensors 103a and 103b are sensors for detecting whether or not a document is placed in their positions. Detection results obtained by the document detector sensors 103a and 103b are supplied to the reading control section 130. Details of the document detector sensors 103a and 103b, and the reading control section 130 are described later.

The pickup roller 104 is a roller for extracting document one by one from documents on the document set tray 101 so as to carry the document. The paper feeding roller 105, and the carrying rollers 106 and 107 are rollers for carrying a document extracted by the pickup roller 104.

The second reading section 113 is for reading an upper surface of a document being carried by the carrying roller 106 etc. As is the case with the first reading section 110, the second reading section 113 includes: a light source for emitting, onto a document, light for reading the document; and an image pickup device, such as a CCD (Charge Coupled Device), for converting optical information into an electric signal. The second reading section 113 irradiates a document being carried with light from the light source so as to receive, by the image pickup device, light reflected on the document. The light thus received is converted into an electric signal. Thus, the second reading section 113 obtains image data of an upper surface of the document.

After passing through a position where the second reading section 113 reads a document, a document is carried to a document reading position 108 where the first reading section 110 reads a document. When the first reading section 110 reads a document carried by the automatic carrying unit 117, the first reading section 110 is positionally constant at the document reading position 108. A reading guide 109 is provided in a position where a document and the document placement glass 116 face each other at the document reading position 108. A document carried by the automatic carrying unit 117 is passed between the document placement glass 116 and the reading guide 109. The first reading section 110 irradiates a lower surface of the document with light from the light source so as to receive light reflected on the lower surface. Thus, the first reading section 110 obtains image data of the lower surface of the document.

Figure 4:
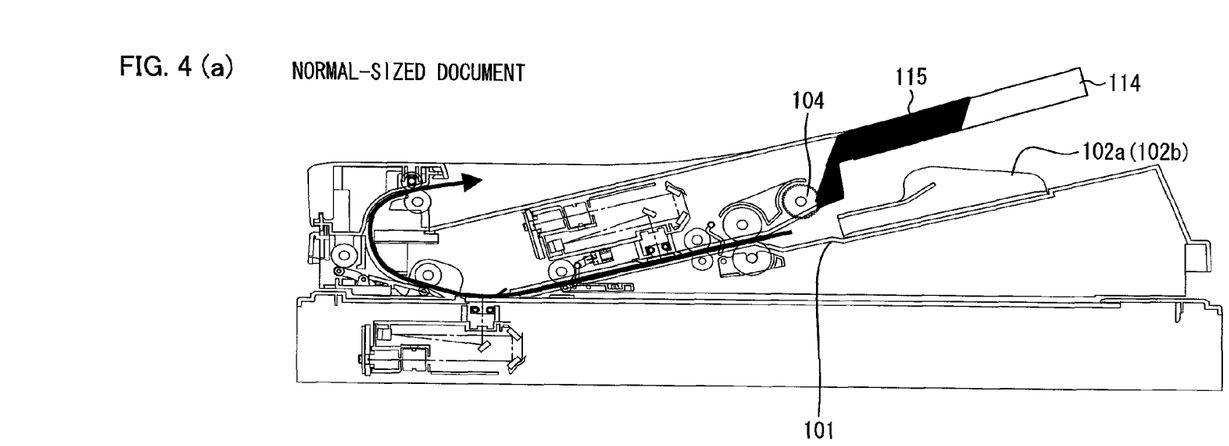

The carrying direction switching section 118 switches, from toward the output roller 111 to toward the output roller 112, a direction in which the document passed through the first reading section 110 is carried. In the present embodiment, as illustrated in FIG. 4(*a*), a normal-sized document which is larger than a predetermined size (e.g., a size of business cards, cash cards, credit cards, driver's licenses, or the like) is carried toward the output roller 112 via the carrying path curved in a shape like "U," and then outputted onto the output tray 114 via the output roller 112. On the other hand, as illustrated in FIG. 4(*b*), a small-sized document which is not larger than the predetermined size is carried toward the output roller 111 via the carrying path which is substantially straight, and then outputted via the output roller 111. It can be arranged such that a document which is not larger than the predetermined size and which has a thickness not smaller than a predetermined thickness is carried to the output roller 111, and in other cases, a document is carried to the output roller 112. In the present embodiment, a document having a width of not greater than 148 mm along the main scanning direction is referred to as small-sized document whereas a document having a width of greater than 148 mm along the main scanning direction is referred to as normal-sized document.

It can be arranged such that the output roller (outputting section for small-sized documents) 111 does not completely output a small-sized document but holds a part thereof (e.g., holds its end portion on an upstream side of the document carrying direction (hereinafter, the upstream side of the document carrying direction is simply referred to as upstream side)) so that a user may pick up the small-sized document. Alternatively, it can be arranged such that an output tray for small-sized documents (outputting section for small-sized documents) is provided for placing thereon a small-sized document outputted via the output roller 111 to a downstream side of the document carrying direction, and a small-sized document is outputted onto the output tray after being read.

Figure 5:
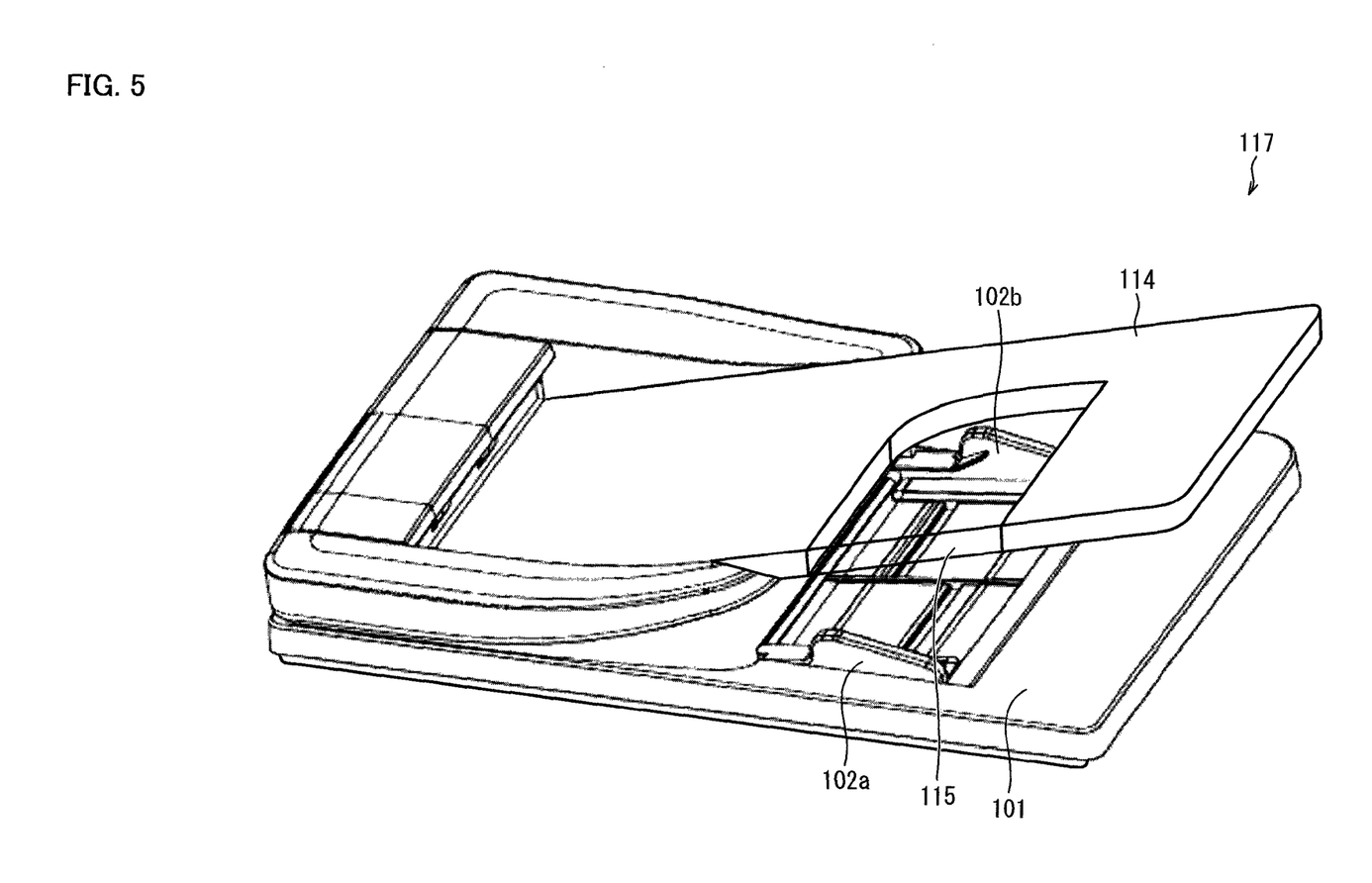
FIG. 5 is a perspective view illustrating an automatic carrying unit which is provided in the image reading apparatus of FIG. 1.

FIG. 5 is a perspective view illustrating the automatic carrying unit 117. As illustrated in FIG. 5, the output tray 114 is provided above the document set tray 101. The output tray 114 has a window 115 made of a transparent material so that a user may see, via the window 115, a document setting position on the document set tray 101. Specifically, as described later, a user can see the whole document of not greater than the predetermined size placed in a position where a document of not greater than the predetermined size is set.

Figure 1:
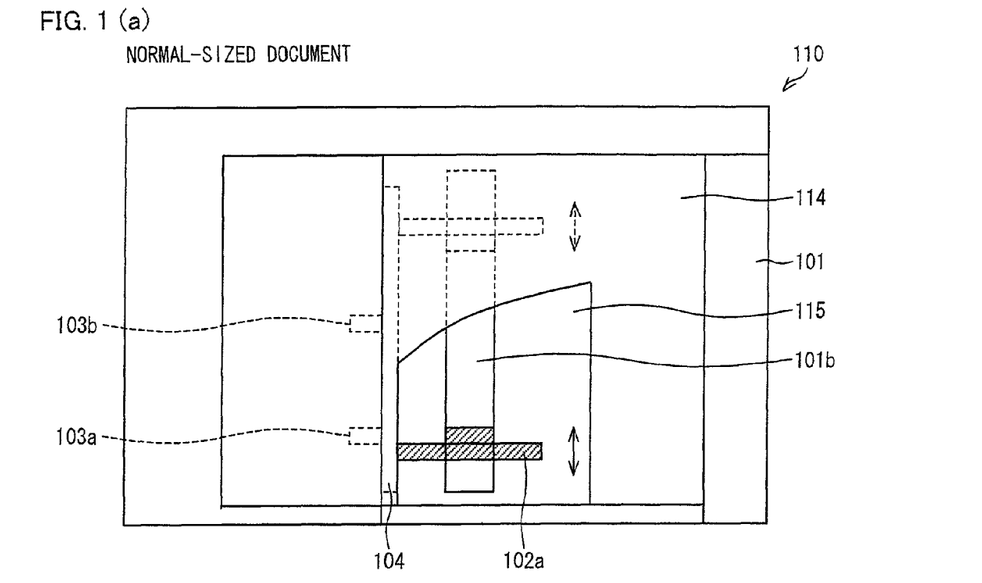

FIG. 1(*a*) and FIG. 1(*b*) are plan views illustrating the image reading apparatus 100 from above. FIG. 1(*a*) illustrates the image reading apparatus 100 on which a normal-sized document (document larger than the predetermined size) is placed. FIG. 1(*b*) illustrates the image reading apparatus 100 on which a small-sized document (document not larger than the predetermined size) is placed.

As illustrated in FIG. 1(*a*), a normal-sized document is placed on the document set tray 101 so that a center of a width of the normal-sized document along the main scanning direction may match a center reference position which is set in a center of a width of the document set tray 101 along the main scanning direction, or set in the vicinity of the center (document center reference).

As illustrated in FIG. 1(*b*), on the other hand, a small-sized document is placed on the document set tray 101 so that a user-side edge of the small-sized document may match a near-side reference position which is set at a user-side end of the document set tray 101, or set in the vicinity of the user-side end (document near-side reference).

Since the output tray 114 is provided above the document set tray 101, the document set tray 101 is covered by the output tray 114 as viewed from a user standing in front of the copying machine 10. However, as described above, the output tray 114 has the window 115 made from a transparent material. Therefore, the user can see, via the window 115, substantially the entire small-sized document placed in accordance with the document near-side reference. As illustrated in FIG. 4(*b*), the window 115 has a shape such that its one side extends, upward from around an end of the pickup roller 104 on the upstream side, with an inclination toward the upstream side. As illustrated in FIG. 3, a head on a carrying-direction side of the small-sized document placed in accordance with the document near-side reference is positioned so as to overlap the pickup roller 104 as vertically viewed from above. However, by seeing from the direction having the inclination instead of seeing from above, a user can see substantially the entire small-sized document placed in accordance with the document near-side reference.

Figure 6:
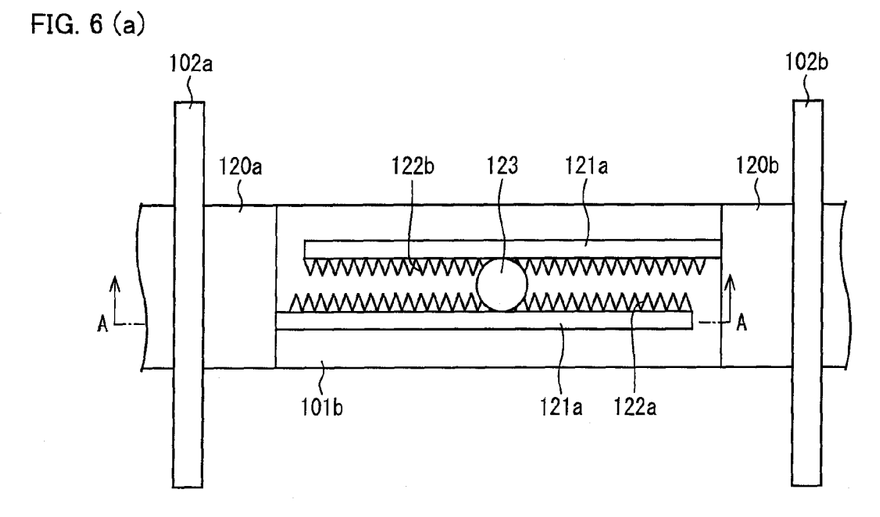
FIG. 6(a) is a plan view illustrating an arrangement of document alignment guides which are provided in the image reading apparatus of FIG. 1.
FIG. 6(b) is a cross-sectional view illustrating the A-A cross-section in FIG. 6(a).

FIG. 6(*a*) is a plan view illustrating an arrangement of the document alignment guides 102*a* and 102*b*. FIG. 6(*b*) is a cross-sectional view illustrating the A-A cross section in FIG. 6(*a*).

As illustrated in FIG. 1(*a*), FIG. 1(*b*), FIG. 6(*a*), and FIG. 6(*b*), the guide supporting sections 120*a* and 120*b* are provided under the document alignment guides 102*a* and 102*b*, respectively. The guide supporting sections 120*a* and 120*b* are fitted in a groove section 101*b* so as to move in a direction perpendicular to the document carrying direction. The groove section 101*b* is that part of the document set tray 101 which is depressed lower than a document placement surface, and extends in the direction perpendicular to the document carrying direction.

In addition, as illustrated in FIG. 6(a), projecting sections 121a and 121b are attached to the guide supporting sections 120a and 120b, respectively. Specifically, the projecting sections 121a and 121b are attached thereto so as to extend toward the guide supporting sections 120b and 120a, respectively, and so as to face, at a predetermined distance, in a direction substantially parallel with the document placement surface. Further, the projecting sections 121a and 121b have respective serrated sections (tooth surface sections) 122a and 122b on their surfaces facing each other. Further, a gear wheel 123 is supported so as to be rotatable in substantially parallel with the document placement surface, between the projecting sections 121a and 121b, in a center (i.e., reference point indicating the document center reference) of a width of the document set tray 101 along a direction perpendicular to the document carrying direction on the document set tray 101. The serrated sections 122a and 122b of the projecting sections 121a and 121b mesh with the gear wheel 123. Accordingly, when a user moves one of the document alignment guides 102a and 102b in the direction perpendicular to the document carrying direction (i.e., in the document width direction), the other one of the document alignment guides 102a and 102b is moved so that the document alignment guides 102a and 102b may be axisymmetrical with respect to an axis which is a straight line passing, in parallel with the document carrying direction, through the reference point indicating the document center reference.

Further, it is arranged such that a user can perform an operation to release an interlock between the document alignment guides 102a and 102b via the guide supporting section 120a, the projecting section 121a, the gear wheel 123, the projecting section 121b, and the guide supporting section 120b. That is, the document alignment guides 102a and 102b are interlocked with each other so as to be switchable between (i) an interlocked state in which movement of one of the document alignment guides causes the other to axisymmetrically move, and (ii) a non-interlocked state in which the document alignment guides 102a and 102b are released from the interlocked state so as to independently move.

A method and a mechanism for switching between the interlocked state and the non-interlocked state are not particularly limited. In the present embodiment, when the document alignment guide 102a is moved to the user-side end in the direction perpendicular to the document carrying direction (i.e., document width direction) as illustrated in FIG. 1(b), the interlock between the document alignment guides 102a and 102b via the guide supporting section 120a, the projecting section 121a, the gear wheel 123, the projecting section 121b, and the guide supporting section 120b is released so that the document alignment guides 102a and 102b may be moved in the document width directions independently of each other.

More specifically, the projecting sections 121a and 121b have respective grooves in their portions to which the guide supporting sections 120a and 120b are attached. On the other hand, the guide supporting sections 120a and 120b have, in their portions to which the projecting sections 121a and 121b are attached, respective projections which fit in the grooves. Further, those biasing measures such as springs which bias the projections in a direction in which the fit of the projections in the grooves is released are provided in respective positions where the document alignment guides 102a and 102b make contact with the projections when moved to the ends of the document set tray 101 which are located along the direction perpendicular to the document carrying direction (i.e., along the document width direction). As a result, the projecting sections 121a and 121b are detached from the guide supporting sections 120a and 120b when the document alignment guides 102a and 102b are moved to the ends. Further, halt mechanisms are provided which cause the biasing measures to stop biasing the projections. This allows the projections to fit into the grooves again when the document alignment guides 102a and 102b are moved to the ends again so that the halt mechanisms may cause the biasing measures to stop biasing the projections. Detached from each other can be only either of (i) the projecting section 121a and the guide supporting section 120a or (ii) the projecting section 121b and the guide supporting section 120b.

Instead, it can be arranged such that the biasing measures and regulation measures are provided so that the mesh between the gear wheel 123 and each of the projecting sections 121a and 121b may be released. The regulation measures (i) regulate, until the document alignment guides 102a and 102b reach the ends, movement of the projecting sections 121a and 121b, and (ii) eliminate the regulation when the document alignment guides 102a and 102b reach the ends. Alternatively, released can be only either of (i) the mesh between the projecting section 121a and the gear wheel 123 or (ii) the mesh between the projecting section 121b and the gear wheel 123.

As illustrated in FIG. 1(a) and FIG. 1(b), the document detector sensor (second document detector sensor) 103b is provided in the center of the width of the document set tray 101 along the document width direction. On the other hand, the document detector sensor (first document detector sensor) 103a is provided to the document set tray 101 at a position closer to a user than the document detector sensor 103b (i.e., at a position corresponding to the document setting position of a small-sized document). Detected results obtained by the document detector sensors 103a and 103b are supplied to a control section of the image reading apparatus 100.

Figure 7:
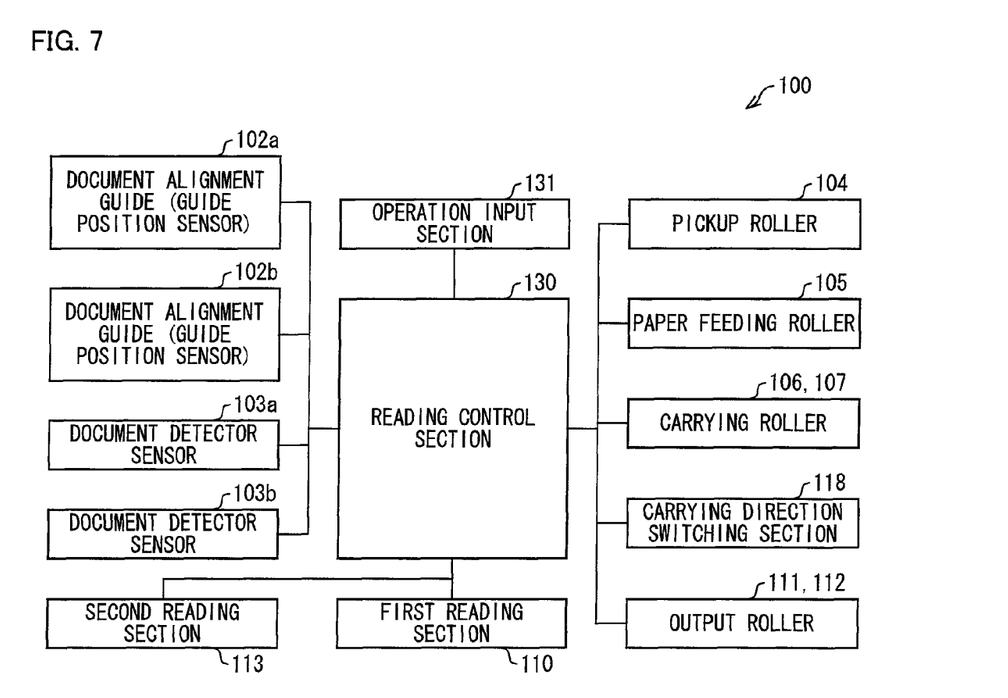
FIG. 7 is a functional block diagram of the image reading apparatus of FIG. 1.
Figure 8:
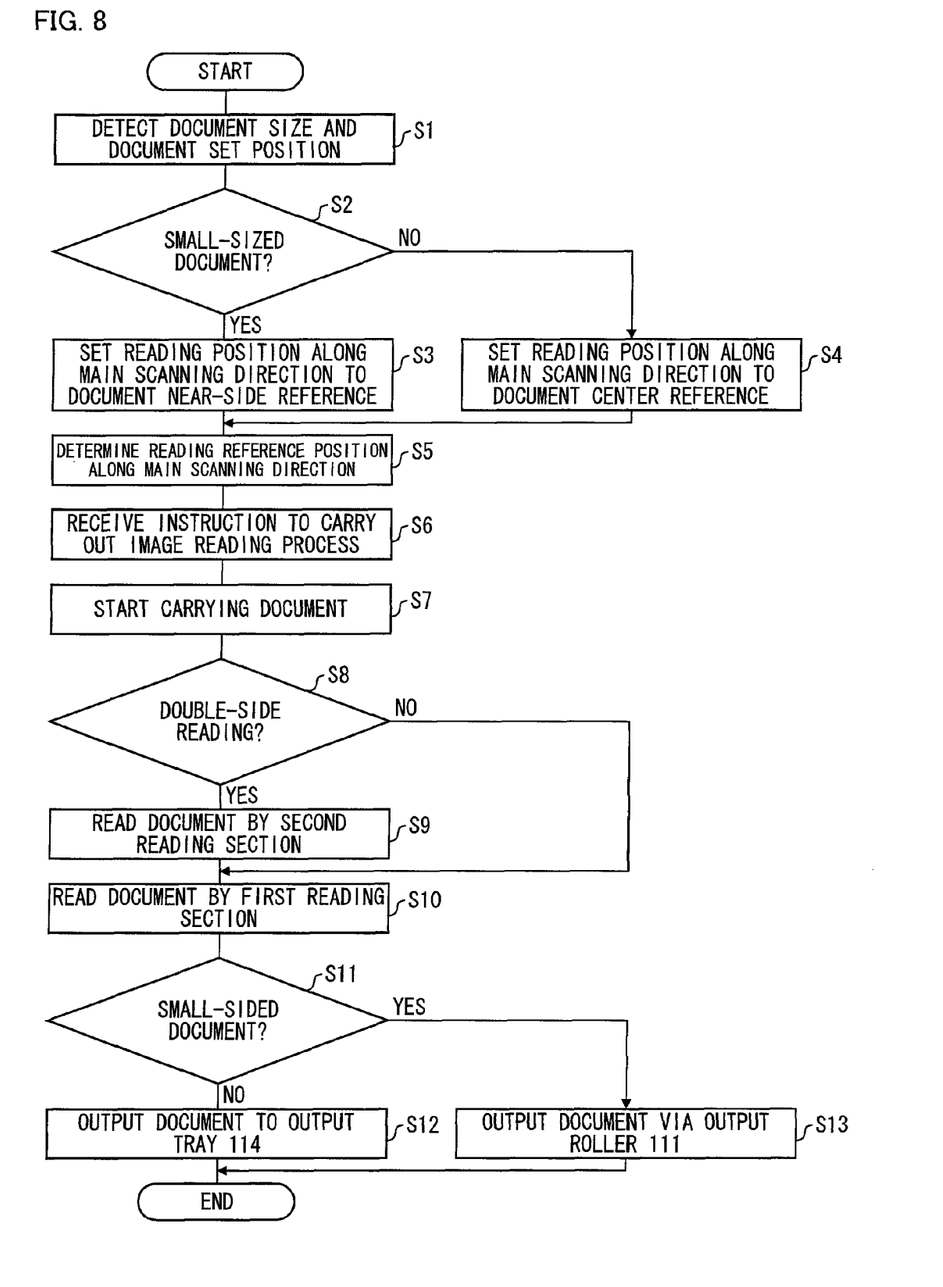
FIG. 8 is a flowchart showing a processing flow of the image reading apparatus of FIG. 1.

FIG. 7 is a block diagram illustrating an arrangement of the image reading apparatus 100. FIG. 8 is a flowchart showing a processing flow in which a document placed on the document set tray 101 of the image reading apparatus 100 is automatically carried so as to be read.

As illustrated in FIG. 7, the image reading apparatus 100 includes a reading control section 130 and an operation input section 131 so that the reading control section 130 controls respective sections of the image reading apparatus 100 in accordance with an instruction supplied from a user via the operation input section 131, detected results supplied from various sensors, etc. The reading control section 130 can be provided in the control section of the copying machine 10, or provided separately therefrom. The operation input section 131 can be the control panel of the copying machine 10. Alternatively, the operation input section 131 can be provided separately therefrom.

A user initially moves the document alignment guides 102a and 102b to positions corresponding to a document size so as to set a document on the document set tray 101. When the document is set thereon, those detected results are supplied to the reading control section 130 which are obtained by the guide position sensors provided to the document alignment guides 102a and 102b, and by the document detector sensors 103a and 103b (S1).

Then, on the basis of the detected results from the document detector sensors 103a and 103b, the reading control section 130 determines whether the document is a small-sized document (document having, along the main scanning direction, a width not greater than a predetermined size) or the normal-sized document (document having, along the main scanning direction, a width greater than the predetermined size) (S2). Specifically, the reading control section 130 determines that the document is a small-sized document if the document detector sensor 103*a* detects the document whereas the document detector sensor 103*b* does not detect the document. If the document detector sensor 103*b* detects the document, the reading control section 130 determines that the document is a normal-sized document.

If YES in S2, the reading control section 130 sets, to the document near-side reference, a reading reference position for the first reading section 110 and the second reading section 113 (S3). If NO in S2, the reading control section 130 sets, to the document center reference, the reading reference position for the first reading section 110 and the second reading section 113 (S4).

Further, the reading control section 130 determines reading positions (reading range) for the first reading section 110 and the second reading section 113, on the basis of (i) the reading reference position set in S3 or S4 and (ii) the width of the document calculated on the basis of the detected results from the guide position sensors provided to the document alignment guides 102*a* and 102*b* (S5).

Figure 9:
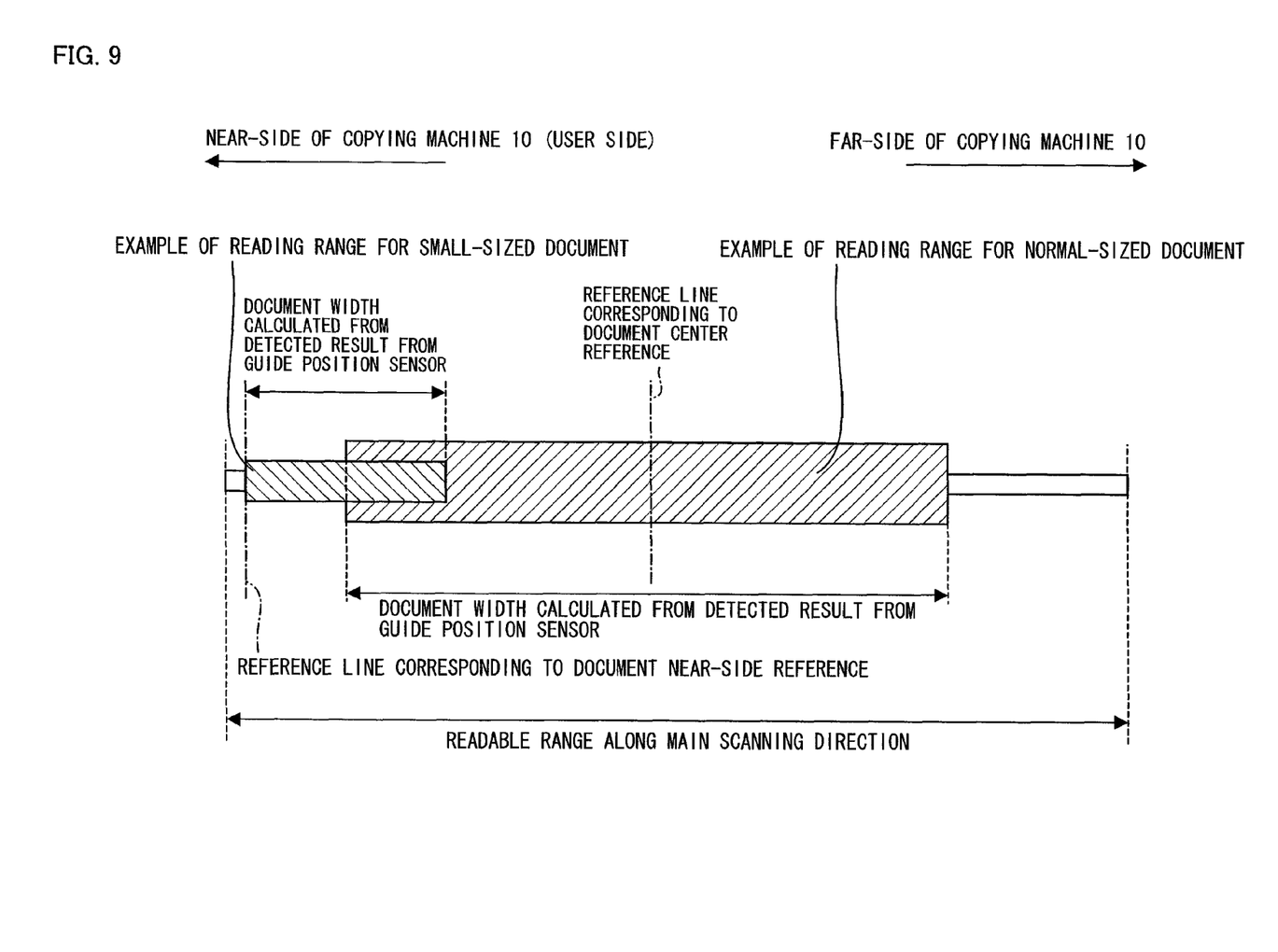
FIG. 9 is an explanatory view showing how an image reading range is set in the image reading apparatus of FIG. 1.

FIG. 9 is a explanatory view illustrating how the reading positions (reading range) are set. As illustrated in FIG. 9, the reading control section 130 determines whether the document is a small-sized document or a normal-sized document on the basis of the detected results from the document detector sensors 103*a* and 103*b*, and then, sets, for a small-sized document, the reading reference position to the document near-side reference, or sets, for a normal-sized document, the reading reference position to the document center reference. Then, the reading control section 130 calculates a document width on the basis of the detected results from the guide position sensors, in order to determine a reading range on the basis of the reading reference position and the calculated document width. The reading range can be slightly wider than the calculated document width.

Then, the reading control section 130 receives an instruction to start an image reading process from a user via the operation input section 131 (S6). Then, the reading control section 131 controls the pickup roller 104, the paper feeding rollers 105, the carrying rollers 106 and 107 so that these rollers may start carrying the document (S7). Then, on the basis of the instruction from the user, the reading control section 130 determines whether instructed by the user is one-side reading or double-side reading (S8). If YES in S8, the reading control section 130 causes the second reading section 113 to read an image, located in the reading positions set in S5, on one side of the document being carried (S9). In addition, the reading control section 130 causes the first reading section 110 to read an image, located in the reading positions set in S5, on the other side of the document being carried (S10). If NO in S8, S10 is carried out by skipping S9.

Then, the reading control section 130 determines whether the document is a small-sized document or a normal-sized document (S11). On the basis of the determination, the reading control section 130 controls the carrying direction switching section 118 and the output rollers 111 and 112 so that the document may be outputted onto the output tray 114 if the document is a normal-sized document (S12) or so that the document may be outputted via the output roller 111 if the document is a small-sized document (S13). The image reading process is thus completed.

As described above, the image reading apparatus 100 of the present invention is arranged such that in a case where a small-sized document is placed on the document set tray 101, positioning of the document to a document setting position on the document set tray 101 is carried out by positionally matching a first edge of the document with the near-side reference position, the near-side reference position set to a position of or set in the vicinity of a first end of the document placement surface of the document set tray 101, wherein the first edge of the document is that one of two edges of the small-sized document which is closer, than the other one of the two edges, to a user-operating side of the image reading apparatus, and the first end of the document placement surface is one of those two ends of the document placement surface which are located along the main scanning direction, the one being closer to the user-operating side than the other one of the two ends. The output tray 114 has the window 115 made from a transparent material so as to allowing a user to see that document setting position on the document set tray 101 in which the user sets a small-sized document.

In placing a small-sized document on the document set tray, the arrangement allows a user to visually check, via the window, the small-sized document and a position on the document set tray where the small-sized document is placed. This makes it possible to adjust the position easily and properly. In addition, the position for a small-sized document is set closer to a user. This allows the user to visually check the document more easily.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

As described above, an image reading apparatus of the present invention includes: a document set tray for placing a document thereon; carrying means for carrying the document placed on the document set tray; a reading section for reading an image on the document carried by the carrying means; and an output tray to which the document after the reading of the image on the document by the reading section is outputted, the output tray being provided so as to overlap, above the document set tray, the document set tray as vertically viewed from above, the image reading apparatus having (i) a small-size mode in which a small-sized document is carried so as to be read and (ii) a normal-size mode in which a normal-sized document is carried so as to be read, the small-sized document having, along a document width direction, a size not greater than a predetermined size, the document width direction being that direction of a width of a document which is perpendicular to a direction in which the document is carried by the carrying means, the normal-sized document having, along the document width direction, a size greater than the predetermined size, the document set tray being arranged such that at least in a case where a small-sized document is placed on the document set tray, positioning of the document to a document setting position on the document set tray is carried out by positionally matching a first edge of the document with a near-side reference position, the near-side reference position set to a position of or set in the vicinity of a first end of a document placement surface of the document set tray, wherein the first edge of the document is that one of two edges of the small-sized document which is closer, than the other one of the two edges, to a user-operating side of the image reading apparatus, and the first end of the document placement surface is one of those two ends of the document placement surface which are located along the document width direction, the one being closer to the user-operating side of the image reading apparatus than the other one of the two ends, and the output tray having a window made from a transparent material, the window allowing a user to see the document setting position in a case where the document placed on the document set tray is a small-sized document.

According to the arrangement, the document set tray is arranged such that at least in a case where a small-sized document is placed on the document set tray, positioning of the document to the document setting position on the document set tray is carried out by positionally matching the first edge of the document with the near-side reference position. Further, the output tray has a window made from a transparent material which window allows a user to see the document setting position in a case where the document placed on the document set tray is a small-sized document. This allows a user to place a small-sized document on the document set tray at a position closer to the user. Furthermore, this allows the user to visually check, via the window, the small-sized document and the position on the document set tray where the small-sized document is placed, while placing the small-sized document thereon. Therefore, the user can see the document while adjusting the position even though the output tray is provided above the document set tray. This makes it possible to adjust the position easily and properly. Therefore, the user can see the document while adjusting the position even though the output tray is provided above the document set tray. This makes it possible to adjust the position easily and properly.

Further, the document set tray can be further arranged such that in a case where the document placed on the document set tray is a normal-sized document, the positioning of the document is carried out by positionally matching (I) a center of the normal-sized document along the document width direction with (II) a center reference position, the center reference position set to a substantial center of the document placement surface along the document width direction.

The arrangement makes it possible to adjust easily and properly a position on the document set tray where a document is placed, even if the document is wide in the document width direction. In addition, the arrangement makes it possible to carry the document by using that central portion of the carrying measure which is located in substantially the central area thereof as viewed along the document width direction. This makes it possible to prevent a document being carried from moving in the document width direction and from tilting. This makes it possible to accurately read a document.

The image reading apparatus can further includes: size detection means for detecting a size of a document placed on the document set tray, the size indicating how large the document is along the document width direction; reference detection means for detecting whether the document is placed in reference to the near-side reference position or the center reference position; and a control section for controlling respective operations of the carrying means and the reading section, wherein on the basis of a detected result obtained by the size detection means and a detected result of the reference detection means, the control section determines a reading range along the document width direction, the reading range being a range in which the reading section reads an image on the document.

The arrangement makes it possible to set the reading range of the reading section appropriately and suitably for a size of a document. This makes it possible to reduce a time required for a reading process and reduce a size of a document image obtained by the reading process.

The image reading apparatus can be arranged such that the predetermined size is set to a size smaller than a distance between the near-side reference position and the center reference position; the reference detection means includes: a first document detector sensor for detecting whether or not a document is positioned in a document setting position for a small-sized document; and a second document detector sensor for detecting whether or not a document is positioned in a document setting position corresponding to the center reference position; if only the first document detector sensor detects a document, the reference detection means determines that a reference position in reference to which the document is placed is the near-side reference position; and if only the second document detector sensor, or both the first document detector sensor and the second document detector sensor detect a document, the reference detection means determines that the reference position is the center reference position.

The arrangement makes it possible to detect, by a simple arrangement, a reference position where a document is set. This makes it possible to reduce the number of parts and thereby reduce manufacturing costs.

The image reading apparatus can further includes two guide members for regulating movement, in the document width direction, of a document placed on the document set tray, wherein: the two guide members are movable, along the document width direction, so as to be distanced from each other in accordance with the size of the document along the document width direction; and the size detection means detects the size of the document along the document width direction on the basis of respective positions of the two guide members which positions are obtained when the document is placed on the document set tray.

The arrangement makes it possible to detect, by a simple arrangement, a size of a document along the document width direction. This makes it possible to reduce the number of parts and thereby reduce manufacturing costs.

The image reading apparatus can be arranged such that the two guide members are switchable between (i) an interlocked state in which the two guide members make interlocked movement so as to move axisymmetrically with each other in reference to the center reference position and (ii) a non-interlocked state in which the two guide members moves along the document width direction independently of each other.

The arrangement makes it possible to switch the guide members to the interlocked state so as to adjust, with reference to the center reference position, a position on the document set tray where a normal-sized document is placed. On the other hand, the arrangement makes it possible to switch the guide members to the non-interlocked state so as to adjust, with reference to the near-side reference position, position on the document set tray where a small-sized document is placed. This allows a user to adjust the position more easily.

The image reading apparatus can further include: a carrying direction switching section for selecting, as a destination to which a document read by the reading section is outputted, between the output tray and an output section for small-sized documents; a first document carrying path extending from the document set tray to the reading section; and a second document carrying path extending from the reading section to the output section for small-sized documents, the first document carrying path and the second document carrying path being substantially straight, and the control section controlling the carrying direction switching section so that, for a small-sized document, the carrying direction switching section selects the output section for small-sized documents, and for a normal-sized document, the carrying direction switching section selects the output tray.

According to the arrangement, a small-sized document can be carried along the first and second document carrying paths which are substantially straight. This makes it possible to properly carry a small-sized document which is difficult to be greatly inflected or folded while being carried. Further, the arrangement in which a normal-sized document is outputted to the output tray provided above the document set tray makes it possible to reduce a size of the image reading apparatus, as compared to an arrangement in which the document set tray and the output tray are horizontally provided.

The image forming apparatus of the present invention includes: any one of the image reading apparatuses and an image forming section for forming an image on a recording material in accordance with image data of a document, the image data read by the image reading apparatus. Therefore, a user can adjust easily and properly a position on the document set tray where a small-sized document is placed even though the output tray is provided above the document set tray.

INDUSTRIAL APPLICABILITY

The present invention is applicable to an image reading apparatus arranged to have an output tray above a document set tray.

REFERENCE SIGNS LIST

10 Copying machine
100 Image reading apparatus
101 Document set tray
101b Groove section
102a and 102b Document alignment guide (guide member and size detection measure)
103a Document detector sensor (reference detection measure and first document detector sensor)
103b Document detector sensor (reference detection measure and second document detector sensor)
104 Pickup roller (carrying measure)
105 Paper feeding roller (carrying measure)
106 and 107 Carrying roller (carrying measure)
110 First reading section (reading section)
111 and 112 Output roller (carrying measure)
113 Second reading section
114 Output tray
115 Window
116 Document placement glass
117 Automatic carrying unit
118 Carrying direction switching section
130 Reading control section (control section)
131 Operation input section
200 Image processing section
300 Image forming section

The invention claimed is:

1. An image reading apparatus comprising:
a document set tray for placing a document thereon;
carrying means for carrying the document placed on the document set tray;
a reading section for reading an image on the document carried by the carrying means; and
an output tray to which the document after the reading of the image on the document by the reading section is outputted,
the output tray being provided so as to overlap, above the document set tray, the document set tray as vertically viewed from above,
the image reading apparatus having (i) a small-size mode in which a small-sized document is carried so as to be read and (ii) a normal-size mode in which a normal-sized document is carried so as to be read, the small-sized document having, along a document width direction, a size not greater than a predetermined size, the document width direction being that direction of a width of a document which is perpendicular to a direction in which the document is carried by the carrying means, the normal-sized document having, along the document width direction, a size greater than the predetermined size,
the document set tray being arranged such that at least in a case where a small-sized document is placed on the document set tray, positioning of the document to a document setting position on the document set tray is carried out by positionally matching a first edge of the document with a near-side reference position, the near-side reference position set to a position of or set in the vicinity of a first end of a document placement surface of the document set tray, wherein the first edge of the document is that one of two edges of the small-sized document which is closer, than the other one of the two edges, to a user-operating side of the image reading apparatus, and the first end of the document placement surface is one of those two ends of the document placement surface which are located along the document width direction, the one being closer to the user-operating side of the image reading apparatus than the other one of the two ends, and
the output tray having a window made from a transparent material, the window allowing a user to see the document setting position in a case where the document placed on the document set tray is a small-sized document.

2. The image reading apparatus as set forth in claim 1, wherein the document set tray is further arranged such that in a case where the document placed on the document set tray is a normal-sized document, the positioning of the document is carried out by positionally matching (I) a center of the normal-sized document along the document width direction with (II) a center reference position, the center reference position set to a substantial center of the document placement surface along the document width direction.

3. The image reading apparatus as set forth in claim 2, further comprising:
size detection means for detecting a size of a document placed on the document set tray, the size indicating how large the document is along the document width direction;
reference detection means for detecting whether the document is placed in reference to the near-side reference position or the center reference position; and
a control section for controlling respective operations of the carrying means and the reading section,
wherein on the basis of a detected result obtained by the size detection means and a detected result of the reference detection means, the control section determines a reading range along the document width direction, the reading range being a range in which the reading section reads an image on the document.

4. The image reading apparatus as set forth in claim 3, wherein: the predetermined size is set to a size smaller than a distance between the near-side reference position and the center reference position;
the reference detection means includes: a first document detector sensor for detecting whether or not a document is positioned in a document setting position for a small-sized document; and a second document detector sensor for detecting whether or not a document is positioned in a document setting position corresponding to the center reference position;
if only the first document detector sensor detects a document, the reference detection means determines that a reference position in reference to which the document is placed is the near-side reference position; and if only the second document detector sensor, or both the first document detector sensor and the second document detector sensor detect a document, the reference detection means determines that the reference position is the center reference position.

5. The image reading apparatus as set forth in claim 3, further comprising two guide members for regulating movement, in the document width direction, of a document placed on the document set tray, wherein:

the two guide members are movable, along the document width direction, so as to be distanced from each other in accordance with the size of the document along the document width direction; and the size detection means detects the size of the document along the document width direction on the basis of respective positions of the two guide members which positions are obtained when the document is placed on the document set tray.

6. The image reading apparatus as set forth in claim 5, wherein the two guide members are switchable between (i) an interlocked state in which the two guide members make interlocked movement so as to move axisymmetrically with each other in reference to the center reference position and (ii) a non-interlocked state in which the two guide members moves along the document width direction independently of each other.

7. The image reading apparatus as set forth in claim 3, further comprising:

a carrying direction switching section for selecting, as a destination to which a document read by the reading section is outputted, between the output tray and an output section for small-sized documents;

a first document carrying path extending from the document set tray to the reading section; and a second document carrying path extending from the reading section to the output section for small-sized documents, the first document carrying path and the second document carrying path being substantially straight, and the control section controlling the carrying direction switching section so that, for a small-sized document, the carrying direction switching section selects the output section for small-sized documents, and for a normal-sized document, the carrying direction switching section selects the output tray.

8. An image forming apparatus comprising:

an image reading apparatus recited in claim 1; and an image forming section for forming an image on a recording material in accordance with image data of a document, the image data read by the image reading apparatus.

* * * * *